United States Patent
Gievers et al.

[11] Patent Number: 6,122,995
[45] Date of Patent: Sep. 26, 2000

[54] TORQUE SUPPORT

[75] Inventors: Winfried Gievers, Wetter; Jens Glogowski; Heinz Schmidt, both of Dortmund; Rainer Woyk, Herdecke, all of Germany

[73] Assignee: Mannesmann AG, Düsseldorf, Germany

[21] Appl. No.: 09/292,258

[22] Filed: Apr. 15, 1999

[30] Foreign Application Priority Data

Apr. 17, 1998 [DE] Germany ............... 198 17 931
May 29, 1998 [DE] Germany ............... 198 25 442

[51] Int. Cl.[7] .................................................. F16H 57/02
[52] U.S. Cl. ...................... 74/606 R; 384/295; 164/98
[58] Field of Search ..................... 74/606 R; 384/295, 384/275, 428; 164/98

[56] References Cited

U.S. PATENT DOCUMENTS

| | | | |
|---|---|---|---|
| 1,879,287 | 9/1932 | Johnson | 384/295 |
| 3,735,645 | 5/1973 | Pickles | 74/606 R |
| 4,756,632 | 7/1988 | Belanger | 384/428 |
| 5,192,137 | 3/1993 | Renard | 384/275 |
| 5,218,256 | 6/1993 | Umezawa et al. | 384/428 |
| 5,319,851 | 6/1994 | Ikezawa | 384/295 |
| 5,345,829 | 9/1994 | Nett et al. | 74/606 R |
| 5,524,508 | 6/1996 | Peters | 74/606 R |
| 5,593,233 | 1/1997 | Kammel et al. | 384/275 |
| 5,645,363 | 7/1997 | Dafforn et al. | 74/606 R |
| 5,799,548 | 9/1998 | Brooks et al. | 74/606 R |
| 5,836,219 | 11/1998 | Klingler et al. | 74/606 R |
| 5,871,286 | 2/1999 | Kern et al. | 384/295 |
| 5,984,823 | 11/1999 | Gage | 74/606 R |

FOREIGN PATENT DOCUMENTS

| | | | |
|---|---|---|---|
| 2-55657 | 2/1990 | Japan | 164/98 |

*Primary Examiner*—David A. Bucci
*Assistant Examiner*—Chong H. Kim
*Attorney, Agent, or Firm*—Cohen, Pontani, Lieberman & Pavane

[57] ABSTRACT

A torque support mountable between a first housing of a driven unit and a second housing of a driving unit includes a scalloped one-piece plastic base body having a first side connectable with the first housing and a second side connectable with the second housing so as to be fixed with respect to rotation relative to both the first housing an the second housing. The first side includes a first planar contact face with through-openings for fastening with the first housing and the second side includes a flange-like edge area with a second planar contact face for resting against the second housing. The plastic piece is injection molded with support webs and includes metal bushings which are arranged perpendicular to the second planar contact face to provide a torque support which is simple and economical to manufacture, mechanically stable, has a certain elasticity and is adaptable to virtually any gear unit connection surfaces. The bushings may be pressed toward the second housing with fastening means while the second planar contact face presses against the second housing in a frictional engagement. Through-openings are formed at the flange-like edge area of the plastic base body for connection of the torque support to the first housing.

9 Claims, 4 Drawing Sheets

TORQUE SUPPORT

BACKGROUND OF THE INVENTION

1. Field of the Invention

The invention is directed to a torque support connectable between a first housing of a drive unit and a second housing of a driven unit.

2. Description of the Related Art

German reference DE 40 21 054 C2 discloses a prior art torque support made from plastic which is arranged between the housing of a wheel block and the housing of a gear unit. One side of the torque support is connected to the wheel block housing and the other side is connected to the gear unit housing such that the torque support is fixed with respect to rotation relative to both the wheel block housing and the gear unit housing. The torque support has a flange with bore holes for the connection to the wheel block housing. The flange may be fastened to an appropriate surface at the wheel block housing by fastening elements such as screws. The connection of the torque support to the gear unit is effected by an outer ring formed at the torque support with an internal toothing. An inner ring arranged on the gear unit housing with a corresponding external toothing may be inserted into the outer ring. A clamping band around the outer ring is used to press the toothings together to produce a positive connection between the inner and outer rings without play.

The above prior art torque support has had extensive success. However, it is disadvantageous that a ring with a correspondingly elaborate external toothing must be provided at the gear unit housing.

SUMARY OF THE INVENTION

It is the object of the invention to provide a torque support which is simple and economical to manufacture, mechanically stable, has a certain elasticity and is adaptable to virtually any gear unit connection surface shapes.

This object is met according to the present invention by a torque support for connection between a first housing of a driven unit and a second housing of a driving unit, comprising a scalloped one-piece plastic body having support webs and including a first planar contact face for resting against the first housing and a flange-like edge area having a second planar contact face for resting against the second housing, said flange-like edge area having first through-openings for receiving fastening elements for connection of said plastic body to the first housing, and a plurality of bushings injection molded into said plastic body and arranged perpendicular to said second planar contact face, said plural bushings having second through-openings for receiving fastening elements such that said plural bushings are urgeable toward said second housing via said fastening elements for frictionally engaging said secondplanar contact face and the second housing.

The solution provides that the shell-shaped or scalloped one-piece plastic base body is manufactured by injection molding with support crosspieces or webs arranged inside the shell. Bushings which are oriented perpendicular to the surface that rests against the second housing are connected via injection-molding in the plastic base body. The bushings can be urged toward the second housing with fastening means while the surface is pressed against the second housing with frictional engagement. Through-openings are formed at a flange-like edge area of the plastic base body. When fastening screws or bolts are used as fastening means, the use of injection-molded bushings enables the tightening of these fastening means up to the permissible torque. At the same time, there is a frictional engagement between the plastic base body and the second housing such, for example, as a gear unit housing. This ensures the required axial and radial frictional engagement between the torque support and the driving unit which cannot be achieved through the bushings alone.

The desired frictional engagement is ensured when the bushings are arranged in the plastic base body such that they do not project beyond the contact face on the screw head side, but rather, at most, terminate flush with the contact face.

In terms of manufacturing technique, the torque support can be manufactured in a very simple manner when the bushings are embedded with a minus tolerance relative to the contact face at the screw head side. The minus tolerance ensures that the bushings will at most terminate flush with the contact face on the screw head side. Because of the manufacturing tolerances, a flawless frictional engagement without additional expenditure is always guaranteed.

In a preferred embodiment, the bushings comprise metal cylindrical bushings which permit the screws to be tightened with high torque.

For uniform contact of the torque support against the second housing, it is advantageous when the contacting surface is an annular surface.

High strength is achieved in the torque support when support webs are arranged in a star-shaped manner about a cylinder ring in the center of the torque support.

A uniform distribution of the contact pressure forces results when the bushings are circumferentially arranged at identical angular distances relative to one another and equidistant from the longitudinal axis of the cylinder ring.

To ensure dimensional accuracy, the plastic base body is constructed with a constant wall thickness.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
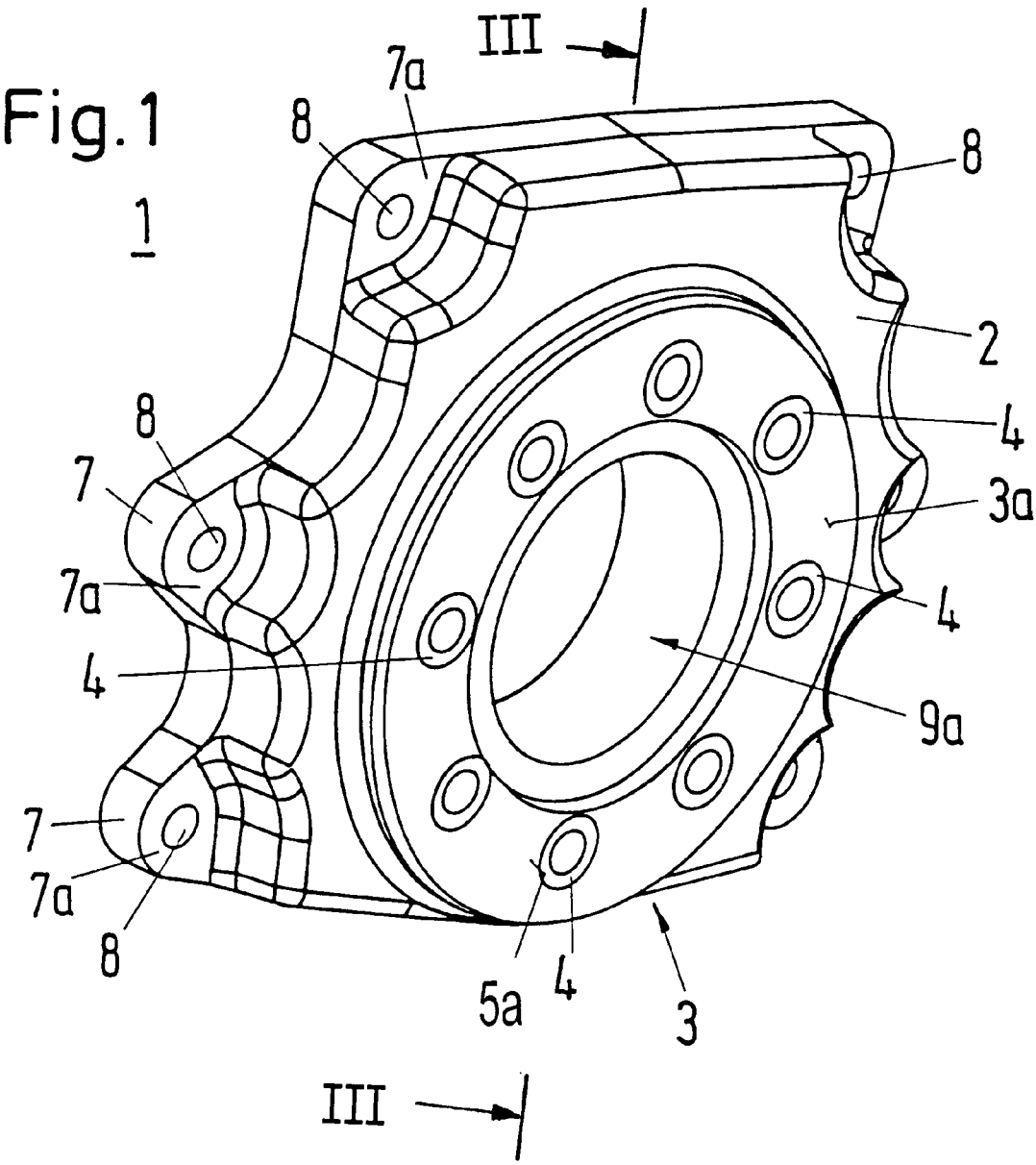
FIG. 1 is a perspective view from a front of a torque support according to an embodiment of the present invention.

FIG. 1 shows a perspective view of a torque support 1 according to an embodiment of the present invention mountable for supporting occurring torques between a first housing of a driven unit such, for example, as a wheel block housing and a second housing of a driving unit such, for example, as a gear unit housing. The torque support 1 has a scalloped plastic base body 2. A first planar contact face 3 including an annular surface 3a is formed on the front side of the plastic base body 2. Hollow-cylindrical bushings 4 oriented with their longitudinal axis perpendicular to the annular surface 3a are circumferentially arranged in the planar annular surface 3a at equal angular distances from one another about a center of the annular surface 3a. Each of the bushings 4 has a front axial end face 5a and a rear axial end face 5b (see FIG. 3). The bushings are arranged in the plastic body 2 such that front axial end face 5a of the bushings 4 terminates, at maximum, flush with the annular surface 3a. That is, the front axial end face 5a is either flush with the annular surface 3a or below the annular surface 3a within the plastic body 2.

Figure 2:
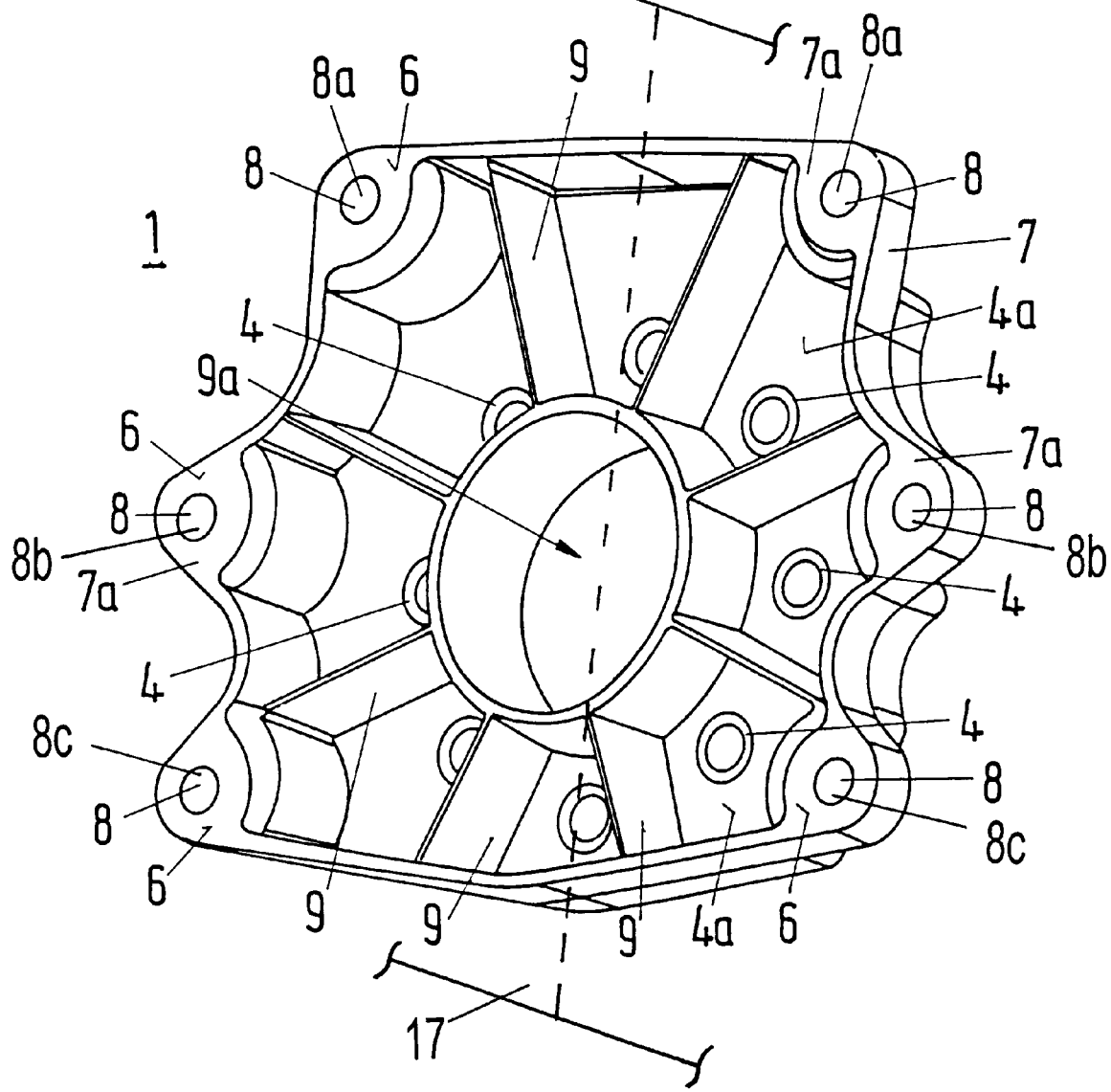
FIG. 2 is a perspective view of the torque support of FIG. 1 from the rear.

FIG. 2 shows the torque support 1 from the rear, wherein the scalloped construction of the plastic body 2 is apparent. The torque support 1 has a second planar contact face 6 on its rear side that is substantially parallel to the annular surface 3a. The second planar contact face 6 is constructed at a flange-like plate-shaped edge 7 of the plastic body 2 wherein the plate-shaped edge 7 includes an outer flange 7a. Injection-molded through-openings 8 are provided in the outer flange 7a. With respect to a vertical plane of symmetry 17 which perpendicularly intersects the first planar contact face 3a and the second planar contact face 6, a through-opening 8 is arranged at the same height on both sides at equal distances from the plane of symmetry. FIG. 2 shows three pairs of through-openings 8a, 8b, and 8c with the uppermost pair indicated as through-openings 8a. The plastic base body 2 which is produced by injection molding has an approximately constant wall thickness and is additionally provided with internal support webs 9. The support webs 9 extend radially in a star-shaped manner from a cylinder ring 9a in a center of the plastic base body 2. The support webs 9 are connected with the cylinder ring 9a.

A drive shaft of the driving unit to which the torque support is connectable is insertable through the cylinder ring 9a in the center of the torque support 1. The cylinder ring 9a is oriented perpendicular to the first planar contact face 3 and the second planar contact face 6. The spacing of the bushings 4 from the longitudinal axis of symmetry of the cylinder ring 9a is identical for all bushings 4.

Figure 3:
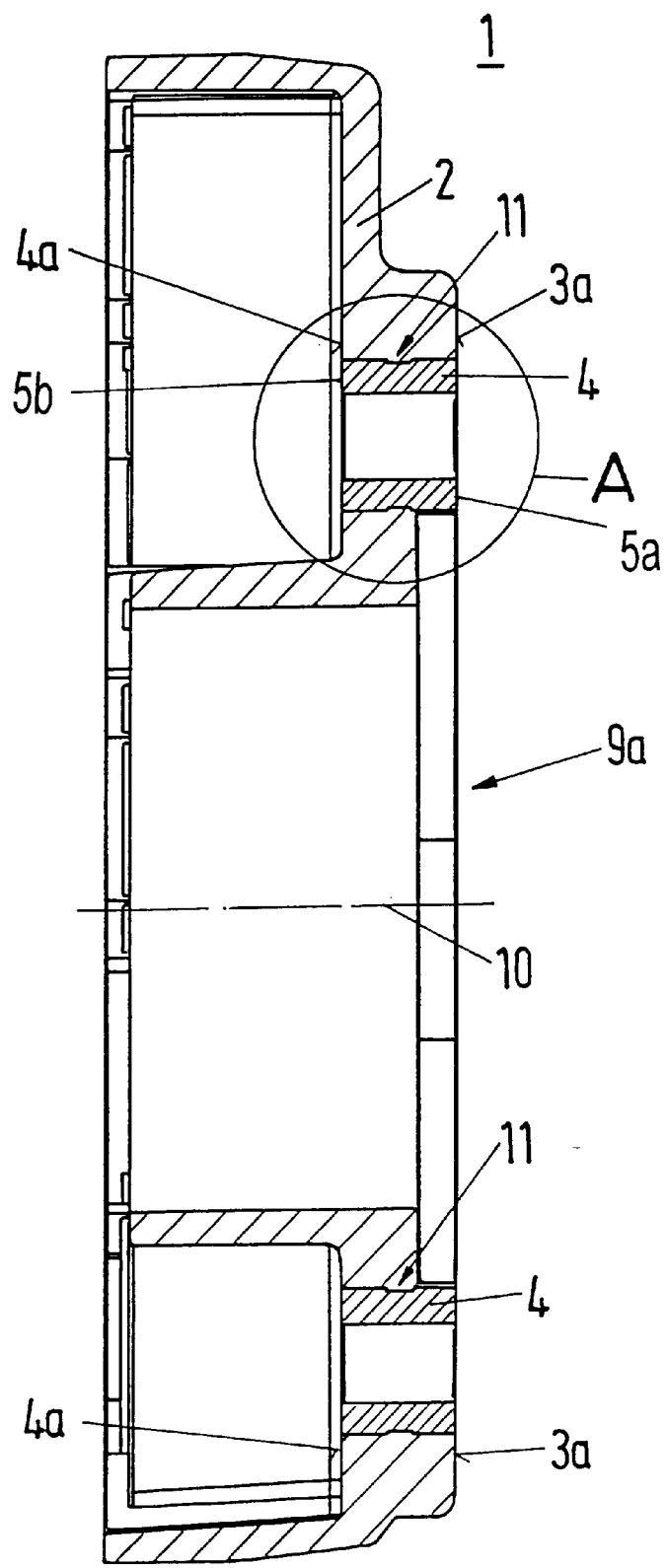
FIG. 3 is a cross sectional view of the torque support according to FIG. 1 through line III—III.

FIG. 3 shows a cross section through the torque support 1. The constant spacing of the bushings 4 from the longitudinal axis 10 of the cylinder ring 9a is apparent in FIG. 3. The bushings 4 comprise metal cylindrical bushings and have, in addition, a radial groove 11 on the outer surface of the bushings 4 between the ends. The radial groove 11 facilitates securing the position of the injection-molded bushings 4 relative to the plastic base body 2. The bushings 4 which terminate so as to be virtually flush with the annular surface 3a at the front side are injection-molded in the plastic base body 2 with a minus tolerance in the torque support 1. That is, the embedding process of the bushings 4 in the base body is designed such that the bushings do not project out beyond the contact face 3a, but rather, at a maximum, terminate flush with the annular contact face 3a. The plastic base body 2 has a third contact surface 4a opposing the annular contact surface 3a. Normally, the rear end face of the bushings 4 extend a short distance of at most $\frac{1}{10}$ millimeter from the contact face 4a. Therefore, a head of a fastening element inserted through the bushing 4 will contact the bushing, not the plastic body 2.

The torque support 1 is usually mounted such that the annular surface 3a contacts an appropriate contact face of a gear unit housing. For fastening purposes, screws are inserted through the bushings 4 threaded into receiving holes in the gear unit housing for connecting the torque support 1 to the gear unit housing. The screws may be tightened with a maximum permissible torque without yielding of the plastic body 2 because the bushings 4 comprise metal. The screws which are inserted through the bushings 4 and threaded into threaded receiving holes in the gear unit housing urge the bushings 4 and the plastic body 2 toward the gear unit housing such that the annular surface 3a is pressed against a contact face of the gear unit housing. In this way, a frictional connection is produced between the plastic base body 2 and the gear unit housing. Subsequently, the torque support 1 may be fastened to a wheel block, for example, in that fastening elements such as screws are inserted through the through-openings 8 and subsequently tightened in receiving holes in the wheel block. The drive shaft of the gear unit extends through the cylinder ring 9a of the plastic body 2. Angular errors between the gear unit and the wheel block are compensated by the elasticity of the plastic body 2. Further, the plastic body 2 damps occurring torque peaks.

The embodiment of the torque support 1 disclosed in FIGS. 1–3 comprises eight evenly distributed bushings 4. Therefore, this torque support 1 may be fastened to the gear box housing in eight different positions, each position being a 45-degree step from the adjacent positions.

Figure 4:
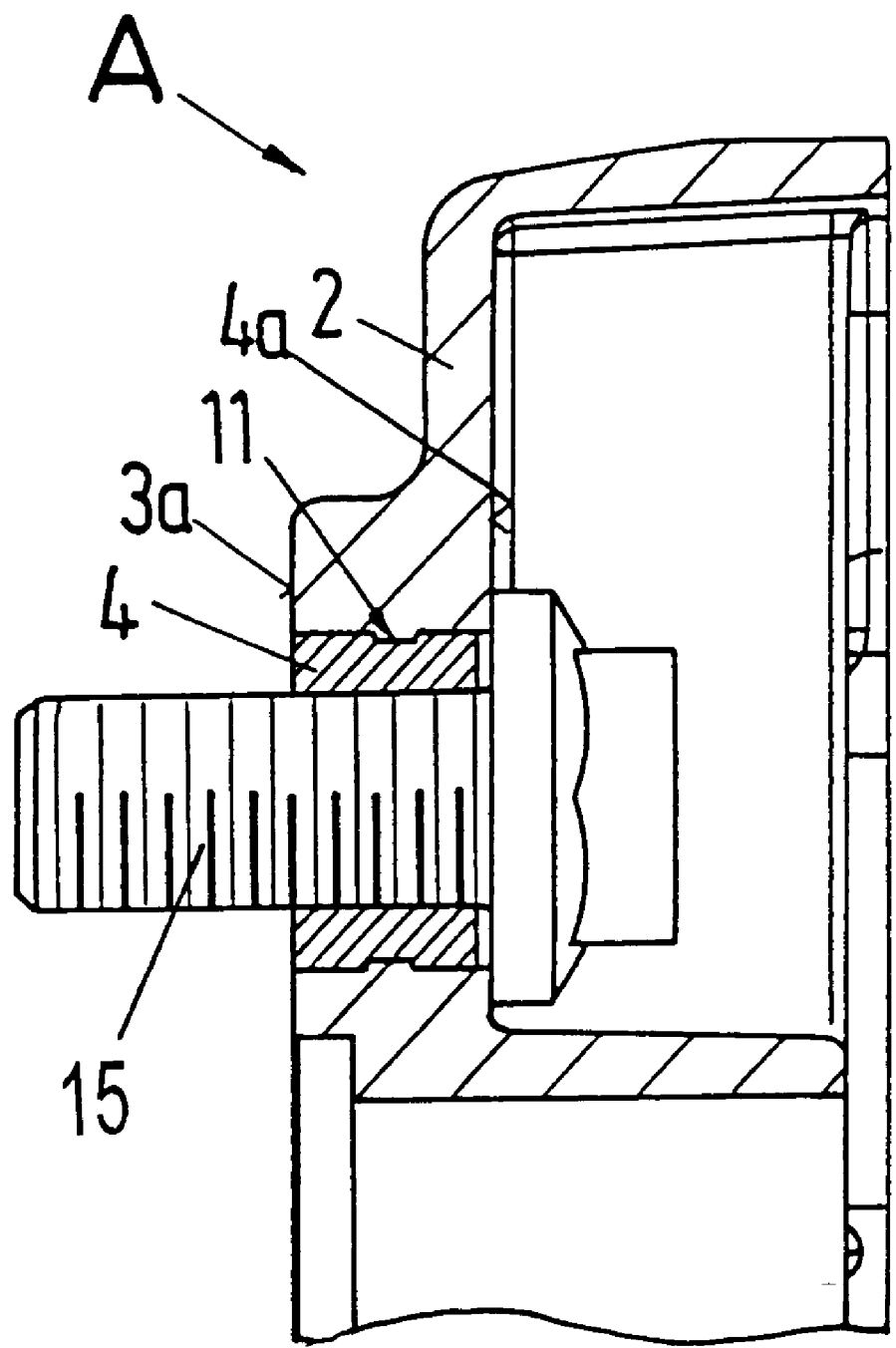
FIG. 4 shows a detailed view of area A of the torque support according to FIG. 3.

FIG. 4 shows a detail of the torque support 1 according to area A in FIG. 3 with a fastening element 15 inserted through the bushing 4. A similar fastening element may also be inserted through the through openings 8 for connecting to the wheel block.

The invention is not limited by the embodiments described above which are presented as examples only but can be modified in various ways within the scope of protection defined by the appended patent claims.

We claim:

1. A torque support for connection between a first housing of a driven unit and a second housing of a driving unit, comprising:

a scalloped one-piece plastic body having support webs and including a first planar contact face for resting against the first housing and a flange-like edge area having a second planar contact face for resting against the second housing;

said flange-like edge area having first through-openings for receiving fastening elements for connection of said plastic body to the first housing; and a plurality of bushings injection molded into said plastic body and arranged perpendicular to said second planar contact face, said plural bushings having second through-openings for receiving fastening elements such that said plural bushings are urgeable toward said second housing via said fastening elements for frictionally engaging said second planar contact face and the second housing.

2. The torque support of claim 1, wherein said plural bushings do not project beyond said second contact face.

3. The torque support of claim 1, wherein said plural bushings comprise a third contact face on a side of said plural bushings opposing said second contact face, said plural bushings being embedded in said plastic body with a minus tolerance relative to said third contact face.

4. The torque support of claim 1, wherein said plural bushings comprise metal cylindrical bushings.

5. The torque support of claim 1, wherein said second contacting surface comprises an annular surface.

6. The torque support of claim 1, wherein said plastic body comprises a cylinder ring arranged at a center of said plastic body and said support webs are connected to said cylinder ring and arranged in a star-shaped arrangement relative to said cylinder ring.

7. The torque support of claim 6, wherein said plural bushings are circumferentially arranged at constant angular distances about said cylinder ring and equidistant from a longitudinal axis of said cylinder ring.

8. The torque support of claim 1, wherein said plastic base body comprises a constant wall thickness.

9. The torque support of claim 1, wherein each said plural bushings comprises a radial groove.

* * * * *